Sept. 28, 1943.  H. E. BRENNAN  2,330,551
WORK GUIDE
Filed March 13, 1942  2 Sheets-Sheet 1
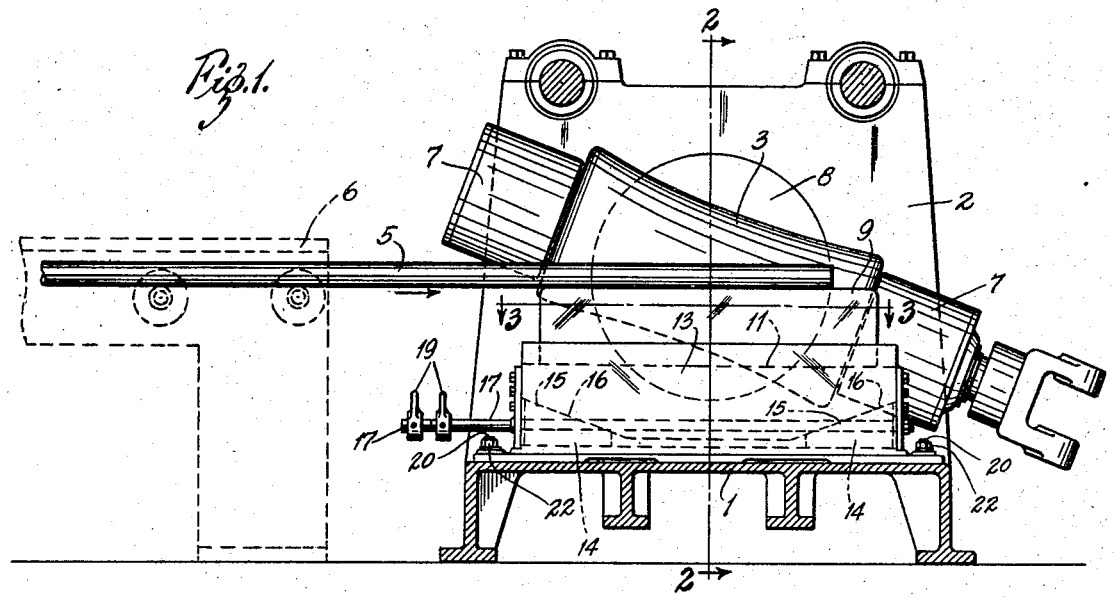
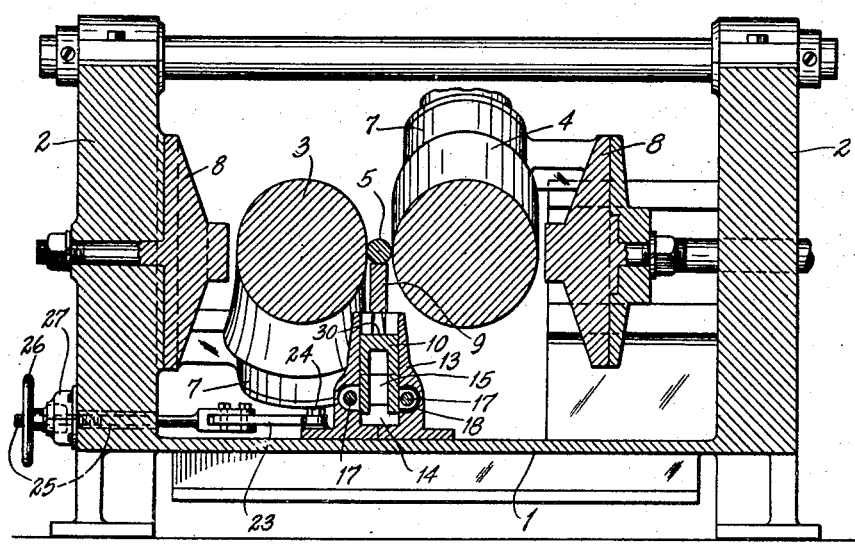
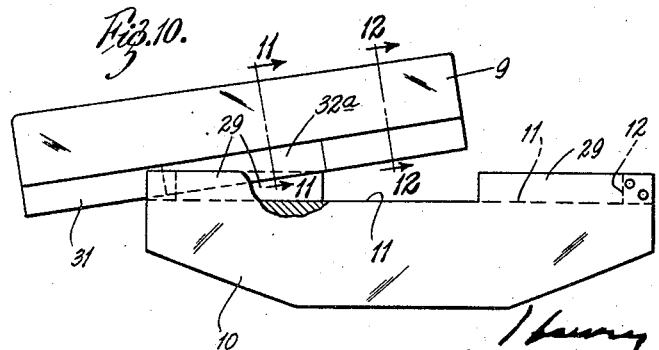
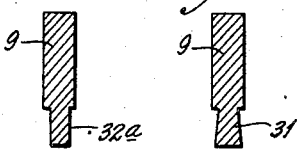
INVENTOR:
Henry E. Brennan
HIS ATTORNEYS.

Sept. 28, 1943.   H. E. BRENNAN   2,330,551
WORK GUIDE
Filed March 13, 1942   2 Sheets-Sheet 2

INVENTOR:
Harvey E. Brennan
HIS ATTORNEY

Patented Sept. 28, 1943

2,330,551

UNITED STATES PATENT OFFICE 2,330,551

WORK GUIDE

Henry E. Brennan, St. Louis, Mo., assignor to The Medart Company, St. Louis, Mo., a corporation of Missouri Application March 13, 1942, Serial No. 434,475

8 Claims. (Cl. 80—51)

This invention relates generally to devices for guiding and supporting from below round stock as it is drawn between and sized, straightened and polished by cooperative work rolls. The invention relates more particularly to devices of the above type wherein the length of the guide and holder therefor corresponds substantially to the length of the work rolls and the guide has a longitudinally slidable connection with the holder that makes it necessary to slide the guide the complete length of the holder in order to mount the guide in and remove it from the holder. A practical objection to this type of sliding connection between the guide and holder is that a clear space equal to the length of the guide must be provided at one end of the work rolls within the machine, or between the guide and the feed table for the machine in order to permit the guide to be inserted in and removed from the holder without detaching the latter from the machine or dismantling parts of the machine or the feed table.

The principal object of the present invention is to devise a simple and economical work guiding device of the above type that will require less clear space for inserting the guide in and removing it from the holder, thereby enabling the length of the machine to be reduced or the feed table to be brought closer to the work rolls. The invention consists in shaping and arranging the sliding joint connection between the guide and holder so that the distance required to slide the guide into and out of the holder is considerably less than the length of the guide and holder. The invention also consists in the construction, combinations and arrangements of parts hereinafter described and claimed.

Figure 3:
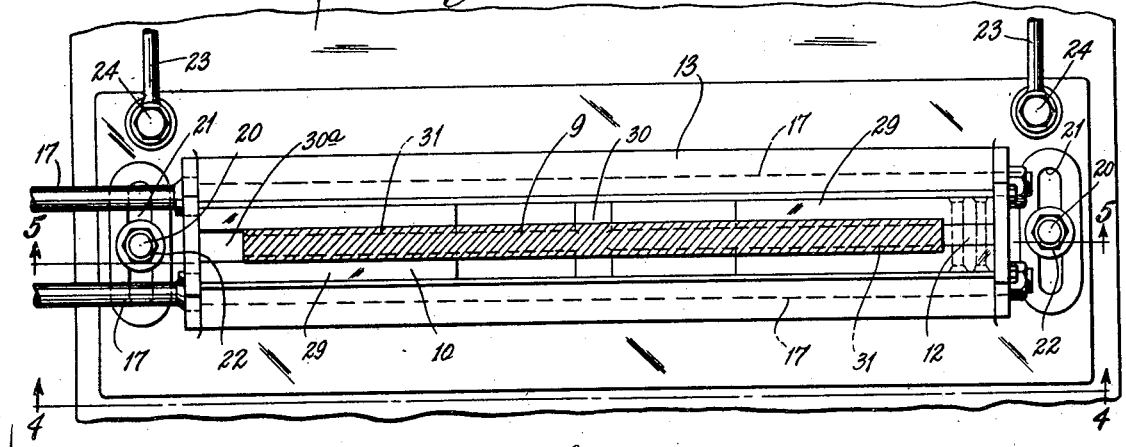
Figure 4:
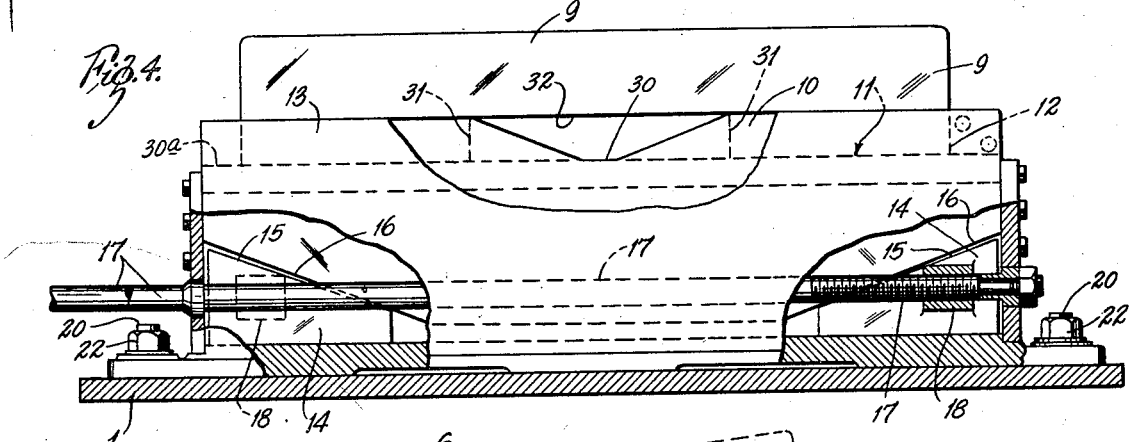
Figure 5:
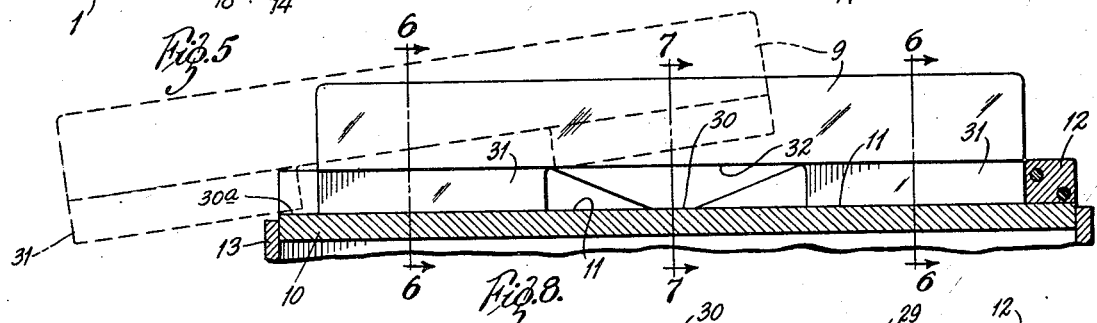
Figure 8:
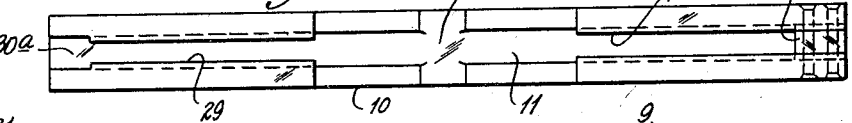
Figure 6:
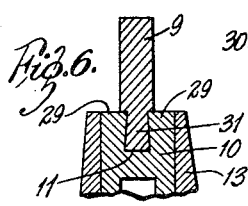
Figure 9:
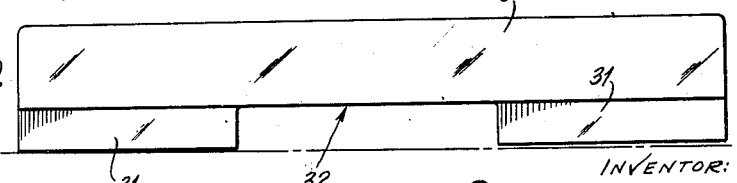
Figure 7:
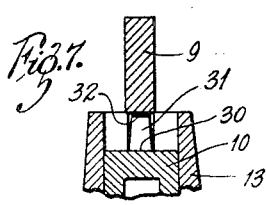

In the accompanying drawings, which form part of this specification and wherein like symbols refer to like parts wherever they occur, Fig. 1 is a vertical central longitudinal section through a cross-rolling machine provided with a work guiding device embodying my invention, Fig. 2 is a vertical transverse section on the line 2—2 in Fig. 1, Fig. 3 is a horizontal section on the line 3—3 in Fig. 1, Fig. 4 is a vertical longitudinal section on the line 4—4 in Fig. 3, Fig. 5 is a vertical longitudinal section through the upper portion of the work guiding device on the line 5—5 in Fig. 3, Figs. 6 and 7 are vertical cross-sections on the lines 6—6 and 7—7, respectively, in Fig. 5, Fig. 8 is a plan view of the guide holder, Fig. 9 is a side elevational view of the work guide, Fig. 10 is a side elevational view illustrating a modified form of work guide and holder; and Figs. 11 and 12 are vertical cross-sections through the guide on the lines 11—11 and 12—12, respectively in Fig. 10.

In the accompanying drawings, my invention is shown embodied in a common type of machine for straightening, sizing and polishing round stock, such as bars and tubes. Said machine comprises a bed 1 having upstanding pedestals 2 at opposite sides thereof, two laterally spaced oppositely inclined power driven work rolls 3 and 4, between which the round stock or work 5 is straightened, sized and polished, and a suitable table 6 for feeding said stock or work to said rolls. In accordance with common practice, the work rolls are journaled in bearings 7 provided therefor on plates 8 sustained by the pedestals 2, and the work roll 3 is longitudinally concave while the other work roll 4 is substantially cylindrical.

Mounted on the bed 1 of the machine and extending upwardly into the space between the two work rolls 3 and 4 is a device for guiding and supporting the work as it is drawn between and sized, polished and straightened by said rolls. This device comprises a vertically disposed work guide in the form of an upright plate 9 that is disposed between and extends longitudinally of the work rolls 3 and 4 and has a straight upper edge adapted to support the work 5 as it passes between said rolls. The guide 9 extends substantially from end to end of the rolls so as to afford continuous support for the portion of the work 5 disposed therebetween. The guide 9 is mounted in a holder 10 that has a longitudinal slideway 11, the upper edge thereof adapted to slidably receive the lower edge of said guide. The rear end of the slideway 11 is closed by means of a filler plate 12 which serves as a stop or abutment for limiting the sliding movement of the guide 9 in the direction in which the work is fed.

The guide holder 10 is mounted for vertical sliding movement in an upright housing 13. The guide holder 10, together with the guide 9 resting thereon, is raised and lowered in the housing 13 to properly position the upper work relative to the work rolls, by means of wedges 14 mounted in the opposite ends of said housing below said guide holder thereof. Each of the wedges 14 is slidable longitudinally of the guide holder 10 and housing 13 and has its upper edge 15 inclined downwardly and inwardly from the end of said holder towards the middle thereof; and the lower edge 16 of each end portion of the guide holder is inclined in conformity with and is supported on the inclined upper edge of the wedge located therebelow. By this arrangement, the guide 8 is raised by sliding the wedges 14 towards each other and is lowered by moving said wedges away from each other. As shown in the drawings, each of the wedges 14 is separately adjusted by means of a screw 17 that is mounted in the lower portion of the holder housing 13 and extends longitudinally from end to end thereof and is threaded through an outstanding lug or other element 18 rigid with the side of a wedge 14. Each screw 17 extends beyond the forward end of the housing 13 and has a lever 19 fixed thereto for manually rotating said screw to actuate the wedge 14 controlled thereby.

The guide housing 13 is secured to the bed 1 of the machine for bodily adjustment in directions transverse to the work by means of studs 20 that project upwardly through elongated slots 21 in the holder and are engaged by nuts 22 that serve to clamp the holder to the bed in the desired position of adjustment. A device for bodily adjusting the housing 13 crosswise of the work comprises a link 23 that has a vertical pivotal connection 24 at one end with said housing and is rigidly connected at its other end to one end of a screw 25 whose opposite end is threaded through the hub portion of a hand wheel 26 that is rotatably mounted in a suitable bearing 27 provided therefor in the adjacent work roll supporting pedestal 2. By this arrangement, the work support may be brought into vertical alinement with the work by rotating the hand wheels 26.

Heretofore, the slideway 11 in the holder or support 10 and the portion of the work guide 9 cooperating with said slideway or groove were shaped to provide a continuous dovetail joint that permitted endwise removal only of said guide from said holder or support. Thus, in order to insert the guide in or remove it from the holder, it was necessary to provide a clear space at the guide receiving end of the holder equal to the length of the guide, or to unbolt the holder from the machine and skew it around therein, or remove the assembled guide and holder entirely from the machine.

The present invention provides an interlocking joint connection between the work guide and holder or support that will materially reduce the length of longitudinal sliding movement required to interlock said guide with and remove it from said holder, thus providing ample clearance space for removing and replacing the guide without disturbing the support therefor and also enabling the work table to be brought closer to the work rolls. In the present joint connection, the longitudinal slideway or groove 11 in the top of the support 10 has undercut side walls that are interrupted along the longitudinal middle portion of said groove, whereby said groove has dovetail end portions 29 and the portion 30 of said groove between said end portions has vertical side walls and is of a width at least equal to the width of the bottoms of said dovetail end portions. The work guide 9 has longitudinal dovetail tongues or ribs 31 depending from the end portions thereof that are of a length corresponding to the length of the dovetail end portions 30 of the groove 11 and are spaced apart, as at 32, midway of the length of said guide, a distance slightly greater than the length of said dovetail end portions. By this arrangement, the guide 9 is secured to the support 10 by placing the guide over said support with the tongue 31 on the overlapping end of the guide positioned in the middle portion 30 of the groove 11 between the dovetail end portions 29 thereof. The guide may then be fully interlocked with the support by shifting the guide longitudinally thereof to cause the dovetail tongue 31 of the guide to slide into the dovetail end portions 29 of the groove 11. The guide 9 is removed from the support 10 by shifting the guide longitudinally of the support a distance equal to the length of the interlocked portion 29 and 31 of the groove and tongues and then lifting the guide vertically from the support.

As shown in the drawings, the forward end of the groove 11 has a relatively short portion 30a that corresponds to the non-interlocking middle portion 30 of said groove and forms a guide and support for the entering end of the trailing tongue of the guide during the operation of attaching the latter to the support. As shown in the drawings, the intermediate, non-interlocking portion 30 of the groove 11 has its side walls inclined downwardly from its ends to its middle so as to provide for drainage. If desired, the groove 11 and tongues 31 may taper in width in the direction in which the guide is slid to interlock the tongues and groove, to thereby limit the movement of said guide in such directions.

As shown in Fig. 10, the side walls of the groove 11 between the dovetail end portions 29 thereof may be entirely cut away; and the guide plate may be provided with a tongue that extends continuously from end to end thereof and has dovetail end portions 31 of a length corresponding to the length of the dovetail grooves 29 in the support, and an intermediate portion 32a that corresponds to the length of said grooves and is thin enough to permit it to be inserted and removed vertically from said grooves.

Obviously, the invention is not restricted to the particular type of cross-rolling machine shown and described.

What I claim is:

1. A device for guiding and supporting stock between cooperating work rolls, said device comprising a guide having an upper stock supporting edge, and a support for said guide, said guide and support having an interlocking tongue-and-groove connection permitting longitudinal movement of said guide on said support, the entire grooved portion of said interlocking connection constituting an immovable part of one of said guide and support, the interlocking portions of said connection being interrupted to permit removal of said guide laterally from said support solely by movement of said guide longitudinally of said support a distance equal to the length of the interlock from fully interlocked position.

2. A device for guiding and supporting stock between cooperating work rolls, said device comprising a guide having an upper stock supporting edge, and a support for said guide, said guide and support having an interlocking tongue-and-groove connection permitting longitudinal movement of said guide on said support, the entire grooved portion of said interlocking connection constituting an immovable part of one of said guide and support, said guide and support having cooperating portions for limiting the movement of said support in one direction of such longitudinal movement, the interlocking portions of said connection being interrupted to permit removal of said guide vertically from said support solely by movement of said guide longitudinally of said support in the other direction a distance equal to the length of the interlock from fully interlocked position.

3. A device for guiding and supporting stock between cooperating work rolls, said device comprising a guide having an upper stock supporting edge and a support for said guide, said guide and support having an interlocking tongue-and-groove connection permitting longitudinal movement of said guide on said support, the entire grooved portion of said interlocking connection constituting an immovable part of one of said guide and support, said tongue-and-groove connection tapering longitudinally in one direction to limit movement of said guide in such direction, the interlocking portions of said connection being interrupted to permit removal of said guide laterally from said support solely by movement of said guide longitudinally thereof in the other direction a distance equal to the length of the interlock from fully interlocked position.

4. A device for guiding and supporting stock between cooperating work rolls, said device comprising a guide having an upper stock supporting edge, and a support for said guide having a series of spaced undercut longitudinal grooves along the top thereof, said guide having a similar series of similarly shaped spaced longitudinal tongues along the bottom thereof, whereby said guide is adapted to be connected to said support by moving said guide transversely thereof to position said tongues in the spaces between said grooves and then sliding said guide longitudinally of said support to cause said tongues to enter said grooves, and said guide is adapted to be removed from said support by sliding said guide longitudinally thereof to disengage said tongues from said grooves and then moving said guide transversely of said support.

5. A device for guiding and supporting stock between cooperating work rolls, said device comprising a guide having an upper stock supporting edge, and a support for said guide having a series of spaced longitudinal dovetail grooves in the top thereof, said guide having a similar series of spaced longitudinal dovetail tongues in the bottom thereof, whereby said guide is adapted to be connected to said support by moving said guide vertically thereof to position said tongues in the spaces between said grooves and then sliding said guide longitudinally of said support to cause said tongues to enter said grooves, and said guide is adapted to be removed from said support by sliding said guide longitudinally thereof to disengage said tongues from said grooves and then moving said guide vertically of said support, said ribs and grooves tapering in one direction of such longitudinal movement to prevent endwise disengagement thereof in such direction.

6. A device for guiding and supporting stock between cooperating work rolls, said device comprising a guide having an upper stock supporting edge, and a support for said guide having a longitudinal groove in the top thereof, said guide having a longitudinal tongue along the bottom thereof adapted to seat in said groove and permit longitudinal movement of said guide on said support, the side faces of the end portion of said tongue and groove cooperating in the engaged position thereof to prevent removal of said guide vertically from said support and the portion of one of said rib and groove between said end portions thereof having a cross-sectional shape adapted to permit removal of said guide vertically from said support when said guide is moved longitudinally of said support to disengage the end portions of said tongue from the end portions of said groove.

7. A device for guiding and supporting stock between cooperating work rolls, said device comprising a guide having an upper stock supporting edge, and a support for said guide having a longitudinal groove along the top thereof, said guide having a longitudinal tongue along the bottom thereof slidable in said groove, said rib and groove having end portions with side faces that cooperate in the engaged portions thereof to prevent vertical removal of said guide from said support and having portions between said end portions with side faces adapted to permit vertical removal of said guide from said support after both end portions of said tongue have been disengaged from both end portions of said support by moving said guide longitudinally of said support.

8. A device for guiding and supporting stock between work rolls, said device comprising a guide having an upper stock supporting edge, and a support for said guide having a longitudinal groove along the top thereof having undercut side walls adjacent to the end portions only of said groove, said guide having downwardly flared longitudinal tongues along the bottom thereof adjacent to the end portions only thereof that are of a length corresponding substantially to the length of the undercut end portions of said groove and are adapted to be engaged therewith by moving said guide longitudinally of said support, the length of the portion of said groove between the undercut end portions thereof corresponding to the length of each of said undercut end portions, thereby permitting vertical removal of said guides from said support when said guide is slid longitudinally of said support to bring one of said longitudinal tongues into the portion of said groove between the undercut end portions thereof.

HENRY E. BRENNAN.